(12) United States Patent
Brown

(10) Patent No.: US 12,321,670 B2
(45) Date of Patent: Jun. 3, 2025

(54) SURFACE PROTECTION DESIGN SYSTEMS

(71) Applicant: Lee Brown, Jensen Beach, FL (US)

(72) Inventor: Lee Brown, Jensen Beach, FL (US)

(*) Notice: Subject to any disclaimer, the term of this patent is extended or adjusted under 35 U.S.C. 154(b) by 0 days.

(21) Appl. No.: 18/199,551

(22) Filed: May 19, 2023

(65) Prior Publication Data
US 2024/0386150 A1  Nov. 21, 2024

(51) Int. Cl.
*G06F 30/12* (2020.01)
*G06Q 50/18* (2012.01)

(52) U.S. Cl.
CPC ............ *G06F 30/12* (2020.01); *G06Q 50/188* (2013.01)

(58) Field of Classification Search
CPC .............................. G06F 30/12; G06Q 50/188
USPC ............................................................ 703/1
See application file for complete search history.

(56) References Cited

U.S. PATENT DOCUMENTS

| | | | | |
|---|---|---|---|---|
| 7,991,680 B2* | 8/2011 | Livesay | ................. | G06Q 40/04 705/37 |
| 2009/0271323 A1* | 10/2009 | Zinniel | .................. | B33Y 40/20 705/26.1 |
| 2022/0102732 A1* | 3/2022 | Li | ....................... | H01M 4/0404 |
| 2023/0289487 A1* | 9/2023 | Schmidt, Jr. | ............ | G06F 30/13 |

* cited by examiner

*Primary Examiner* — Andre Pierre Louis

(57) ABSTRACT

A computer-based method for designing surface protection systems for spaces is provided. The method includes the steps of searching for past saved appointments, loading selected past saved appointments, modifying the selected past saved appointments, creating a new project based on the modified selected past saved appointments, adding new rooms and features, drawing out space design aspects for the new rooms and features, selecting surface types for the space design aspects, including site specific surface, appending use specific design products, selecting from predesigned formulations for the new project, designing new formulations, selecting colors, calculating costs for, estimating time frames, providing iterative return design choice reconfigurations, finalizing a list of materials, list of processes, list of costs, list of chronology of events, and description and list of deliverables, and engaging in an offer/counter offer iterative process which results in a mutually approved contractual agreement.

6 Claims, 6 Drawing Sheets

SURFACE PROTECTION DESIGN SYSTEMS

FIELD OF THE INVENTION

The present invention relates generally to surface protection systems, and more particularly, to surface protection design systems, which utilize algorithms to design and select appropriate constituent components for a composite layered surface protection system.

COMPUTER PROGRAM LISTING APPENDIX

The present invention incorporates Appendix D in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Many methods, devices, and systems have been unsuccessfully attempted to choose a combination of materials to provide optimum surface protection while at the same time allowing for aesthetic design considerations and functional application. Many of these previous attempts were costly and cumbersome to use and quite often did not take into consideration all of the environmental factors of specific surface applications.

Quite often surface protection professionals employ manually selected processes to choose colors, patterns, materials, and choices of layers in designing surface protection systems. These manual processes are time consuming, are vulnerable to subjective design choices, and ultimately more expensive due to the variability of factors that are involved in selecting surface protection materials.

Further, previous methods utilized to design surface protection layered systems focused on providing aggregate layered surfaces to endure specific final compressive and/or tensile stress exposures only. Consideration for a totality of conditions, such as aesthetic features, transient environmental conditions including seasonal temperature, surface loading, maintenance chemical exposures, water permeability, and system life cycle targets, were not taken into account in the design of layered surface protection systems.

Additionally, these previous methods and systems were costly, cumbersome due to the manual nature involved in the design process, and time consuming.

Accordingly, there is an established need for surface protection design systems which solve at least one of the aforementioned problems. Further, there is an established need for surface protection design systems which can be utilized more efficiently and effectively and provide a variety of desired aesthetic design options, while meeting functional demands, without excessive costs.

SUMMARY OF THE INVENTION

The present invention is directed to innovative and cost-effective surface protection design systems which can be utilized to choose uniquely styled surfaces. Further, the present invention is directed to innovative, ergonomically designed, surface protection system design tools utilizing unique algorithms to provide surface protection professionals the ability to create custom surfaces specifically appropriate to an end user's aesthetic and functional preferences.

A computer-based method for designing surface protection systems for spaces is provided. The method includes the steps of searching for past saved appointments. The method also includes loading selected past saved appointments. The method further includes modifying the selected past saved appointments. Additionally, the method includes creating a new project based on the modified selected past saved appointments. Moreover, the method includes adding new rooms and features to the new project. The method includes drawing out space design aspects for the new rooms and features of the new project. The method also includes selecting surface types for the space design aspects for the new project. The method further includes including site specific surface products for the new project. Additionally, the method includes appending use specific design products for the new project.

Moreover, the method includes selecting from predesigned formulations for the new project. The method includes designing new formulations for the new project. The method also includes selecting colors for the new project. Additionally, the method includes calculating costs for the new project. Further, the method includes estimating time frames for the new project. Moreover, the method includes providing iterative return design choice reconfigurations. The method includes finalizing a list of materials, list of processes, list of costs, list of chronology of events, and description and list of deliverables for the new project. The method also includes engaging in an offer/counter offer iterative process wherein a consumer engages in the offer/counter offer iterative process with a business owner representative and in a near real time fashion results in a mutually approved contractual agreement wherein the mutually approved contractual agreement is a legally binding agreement between the consumer and the business owner for implementation of a surface protection design for a space.

A computer program system, including a computer usable medium having a computer readable program code therein, the computer readable program code adapted to be executed for designing a surface protection design and agreement. The method includes the steps of searching for past saved appointments. The method also includes loading selected past saved appointments. The method further includes modifying the selected past saved appointments. Additionally, the method includes creating a new project based on the modified selected past saved appointments. Moreover, the method includes adding new rooms and features to the new project. The method includes drawing out space design aspects for the new rooms and features of the new project. The method also includes selecting surface types for the space design aspects for the new project. The method further includes including site specific surface products for the new project. Additionally, the method includes appending use specific design products for the new project.

Moreover, the method includes selecting from predesigned formulations for the new project. The method includes designing new formulations for the new project. The method also includes selecting colors for the new project. Additionally, the method includes calculating costs for the new project. Further, the method includes estimating time frames for the new project. Moreover, the method includes providing iterative return design choice reconfigurations. The method includes finalizing a list of materials, list of processes, list of costs, list of chronology of events, and description and list of deliverables for the new project. The method also includes engaging in an offer/counter offer iterative process wherein a consumer engages in the offer/counter offer iterative process with a business owner representative and in a near real time fashion results in a mutually approved contractual agreement wherein the mutually approved contractual agreement is a legally binding agreement between the consumer and the business owner for implementation of a surface protection design for a space.

In embodiments, the system can include unique computer programs which can be used in real time by designers to choose a surface design pattern utilizing a plurality of shapes and/or patterns such as but not limited to snowflakes, triangles, circles, squares, trapezoids, ellipses, globules, free form enclosed two dimensional rounded shapes, silhouette shapes of persons, animals, common objects, and/or a combination.

In embodiments, the system can include unique computer programs which can be used in real time by designers to choose a surface design pattern utilizing a plurality of colors, textures, and materials.

In embodiments, the system can include unique computer programs which can be used in real time by designers to choose a surface design pattern utilizing a plurality of three dimensional shapes such as but not limited to roofs, cabinets, closet enclosures, pool area structures, loading docks, warehouse spaces, stairwells, domed surfaces, arched enclosures, and/or bridges.

In embodiments, the system can include unique computer programs which can be used in real time by designers to choose a surface design which takes into account discretely designed color palettes.

In embodiments, the system can include unique computer programs which can be used in real time by designers to choose a surface design allowing free communication of air, water, gas, or fluid through permeable openings within a system.

In embodiments, the system can include unique computer programs which can be used in real time by designers to choose a surface design which can include tapered openings, wherein the tapered openings have a smaller opening on one of the surfaces of a surface and a larger opening on the opposite side surface of the surface system.

In embodiments, the system can include unique computer programs which can be used in real time by designers to choose a surface design which can include calculations for ground water presence, back pressure fluctuations, and overall cyclical stress cycles experienced by a composite layered surface on a daily, per event (heavy rain, snow, foot and vehicular traffic), per season, and overall life cycle usage.

In embodiments, the system can include unique computer programs which can be used in real time by designers to choose a surface design which can include contrasting color patterns to include trademarked color schemes and/or patterns.

In embodiments, the system can include unique computer programs which can be used in real time by designers to choose a surface design which can include composite layers and to construct a timeline of events in a Gannt chart to provide milestones in constructing the composite layers including events to determine application time, dwell time, curing time, and overall chronology of events towards delivery of a functional surface protection system.

In embodiments, the system can include unique computer programs which can be used in real time by designers to choose a surface design which can include choosing training evolutions needed to be undertaken by installation professionals prior to installation to properly educate the personnel on specifics of the materials chosen for that particular surface design.

In embodiments, the system can include unique computer programs which can be used in real time by designers to choose a surface design which can include taking into account design variables such as chemical exposure and/or mechanical abrasion.

In embodiments, the system can include unique computer programs which can be used in real time by designers to choose a surface design which can include taking into account factors such as overall cost, minimum anticipated life cycle, and fastest time to completion.

In embodiments, the system can include unique computer programs which can be used in real time by designers to choose a surface design which can include features for underwater usage.

In embodiments, the system can include unique computer programs which can be used in real time by designers to choose a surface design which can include exterior and interior surfaces and can include pre-loaded commercially available standardized components such as but limited to closets, cabinets, storage enclosures, and exterior fixtures such as but not limited to pools, patios, decks, stairs, overhead coverings, gazebos, fountains, walkways, garden paths, and/or driveways.

In embodiments, the system can include algorithms which factor in surface areas, columns and column spacing, top surface designs for various vehicular and/or personnel traffic, cyclical patterns such as per hour, daily, weekly, monthly, seasonal, and yearly usage.

In embodiments, system can include algorithms which factor in subterranean media composition and depth such as determining the geographical location of the installation and commonly found scenarios, taking into account the depth and locations of media types such a clay, sand, gravel, aggregate and factoring these conditions in determining the necessary layer composition of the surface covering to include functioning taking into account subsurface pressures, pressure differentials, and subterranean surface fluctuations.

In embodiments, the surface protection design system can include providing designs that allow for a plurality of water permeability design goals such that exterior and interior applications can be designed to allow a considerable amount of surface water on a top of a surface design to quickly dissipate through the surfaces of the system in order to maintain fidelity to the surface layer mechanical characteristics and can also include designs which are not permeable to any fluid dissipation. In embodiments in where surface fluid permeability are design considerations, applications such as exterior vehicular traffic ways and specialty chemical handling areas are taken into consideration in determining whether fluid will be allowed to penetrate and flow through a surface design.

In embodiments, the system can include a computer-based platform wherein a system user can interact with the surface protection design system and interactively design a uniquely built layered surface protection system from a mobile device, a smart phone, a laptop, and/or a stationary computer.

In embodiments, the system can include discreet modules from wherein a system user can interact with the system.

In embodiments, the system can include a module and a user interface which guides the user in an interactive and iterative manner to choose surface characteristics, shapes, base colors, predesign blend, select a custom chip color which includes an image of the selected color or colors along with the associated percentage of the design concentration.

In embodiments, the system can include a module which allow the user to search for past appointments which include saved room data and pricing from previous appointments associated with the user.

In embodiments, the system can allow a system user to create a new appointment and fill out preset interchangeable fields and use this data to create a history for the current appointment along with calculating pricing based on distance from the office.

In embodiments, the system can include a new room module wherein a system user can select a room or job type such as but not limited to garage, patio, lanai, pool, pool deck, driveway, carport, loading dock, warehouse, bike pathway, pedestrian pathway, atrium, bridges, hospital rooms such as surgical suites, ambulatory rooms, ICU rooms, immunome deficient patient areas, cancer treatment areas, psychiatric patient areas, clean rooms, computer assembly areas, infectious disease containments, and/or schools.

In embodiments, the system can include design factors such as color selections for different rooms and applications based on pre-loaded design considerations. For example, areas with heavy sun exposure such as pool areas will include design suggestions to stay away from choosing colors and/or designs which are susceptible to degradation with exposure to the sun.

In embodiments, the system can include providing additional support surface design layers to accommodate structural and design load considerations.

In embodiments, the system can include operating platforms such as mobile applications.

In embodiments, the system can include factoring in usage of material in designed application which take into account closed environments and the number of air exchanges within those spaces which dictate chemical gas offing and curing times of selected materials and time to assemble the composite layered surfaces. In embodiments, the system can allow elimination of previously nominal restrictions. Unlike other formulators embodiments of the present invention include capabilities opening up the possibilities of what colors can be used when using color blend tools, there are not preset templates, it can be unique each and every time. There are an unlimited number of combinations. When going back to the formula it allows a larger breadth of options because there are no constraints.

In embodiments, the system can allow inclusion of pre-loaded unique surface characteristics so that when choosing types of surfaces are chosen the specific characteristics may be beneficial to include in the design are offered up by the program.

In embodiments, the system can include rules which allow for utilization of each product and component in each application. Such as in hospital applications the system can include additives and surface layer components which are useful and beneficial in healthcare settings such as antimicrobial surfaces.

In embodiments, the system can include interactive algorithms and modules wherein an onsite system professional is taking site specific information, such as images, ground conditions, and performing measurements of the ground including but not limited to moisture readings. The system can include configurable algorithms which take into account the moisture percentages and provide suggested additives and components which provide structural support for the designed surface system. The moisture reading provides how much ground pressure is coming up through the surface, the need for an additional layer may be needed such as hydro stop or ox stop. If a 5% or 10% reading is entered, the algorithm responds with moisture barriers as needed.

In embodiments, the system can include algorithms which allow a system professional to indicate the presence, size, magnitude, and characteristics of cracks, divots, surface imperfections, surface uniqueness, the overall shape of a pad, an accurate estimate of the areas needing protection are all inputs from a system professional who is customizing each specific application and wherein the inputs interact with the system algorithms to provide unique surface protection options as well as accurate pricing. Patterns and materials are unlimited hardwood floors, tiles, ceramic, coatings, no limit as to applying any material that exists, anything. How much coverage, the color formulation, the algorithm can make the system completely interchangeable.

In embodiments, temperature and UV and surface rules can apply. You may want to consider pools; the exterior characteristics are all considered.

In embodiments, the system can include algorithms which take into account the environment wherein the protection surface is to be deployed and take into account the types of surface coverings available and based on the specific water permeability needs of the surface, the expansion and contraction which is to be considered, the need to repel moisture or to absorb water, the exposure of the surface to chemicals such as salts, corrosives, base solutions, acidic solutions, the system can allow for the algorithm to include these considerations and output appropriate design choices in the form of different materials, such as but not limited to caulking, grout, bonding, latex covering, tile, ceramic, natural rock, concrete, asphalt to be considered in the design of the surface protection. Pavers, tiles, can be used as modular planning components. Compacted kinetic sand, interior or exterior mortar are considerations that are may be considered by the algorithm based on the application.

In embodiments, the system can include algorithms which take into account exterior or interior environments and based on application can allow for choosing appropriate materials in those situations such as base layers, different grout, different installation processes.

In embodiments, the system can allow for accurate and concise design considerations and choices such that the pricing associated with the process realizes a refined calculation allowing for fast and precise pricing such that the system user, or the consumer, obtains the appropriate designed surface protection and the surface designer or entity providing the materials and services provides an accurate cost approximation of the surface protection installation and both the consumer and professional services provider do not encounter surprise costs over runs or hidden costs in the materials and processes chosen to install the protective surface.

In embodiments, the system can allow for algorithms which take into account specific surface areas, product, application specific characteristics, cracks, divots, and can provide for accurate pricing and allows for a repeatable process which allows for economic certainty and repeatability in the field. In embodiments, these economic refinements allow for large scale deployment in a commercial setting and provide for sound economic predictability. Overrides for deleting specifics, delete area or add additions add microbial, user can further personalize the designed surface.

In embodiments, the system can include interactive algorithms wherein the system professional inputs specific information such as surface design parameters such as roofs, cabinets, closets, walls, to any surface that exists.

In embodiments, the system can include interactive algorithms wherein the system professional inputs specific information which result in informing the professional that certain training needs to take place such as training evolutions needed to be undertaken to properly understand and implement the design features needed in the surface protection being installed. The system builds an installation sheet that informs what needs to be done overall footprint of the area, so that only one person needs to visit a site, interact with the customer, and with only that one visit the specific items including training, and application specific evolutions that need to take place are identified such that all other planning and actions needed to perform the installation are done with only one site visit. The type of coatings, divots, additional hydro barriers, grid sheets get built by the system and are able to be developed prior to coming back onsite to perform the job.

In embodiments, the system can include interactive algorithms wherein the system professional inputs specific information which result in inputting characteristics of preloaded commercially available components such as cabinets, slat wall, store wall, windows, helical piers, anything to build a floor plan for product placement, ox foundations, encapsulation of basements, gird sheets with product placement. System can take into consideration geographical considerations such as snow, salt, temperature, rainfall. System can take an office zone and based on the zone that is chosen, site specific weather conditions are input to the algorithm to take into account weather conditions, temperature swings, sun exposure, amount of sunlight per day, freezing condition excursions, are all considered in allowing the system to provide appropriate materials, coatings, moisture barriers, additives, and surface treatments to optimize the surface protection chosen.

In embodiments, the system can include interactive algorithms wherein the system the coatings are based on a temperature set, the system can understand the time of year, and where the surface protection is being installed. So in environments where ground water has inherent hard salts and minerals which can cause degradation and discoloration to exterior surfaces, the system can include additives and coatings to provide protection against those existing conditions.

In embodiments, the system can include interactive algorithms wherein the system can include rules which factor in site or industry specific design factors.

In embodiments, the system can include interactive algorithms wherein the system the system can include roof pitches and roof gutter placements and slopes of surfaces.

In embodiments, the system can include interactive algorithms wherein the system takes into account special chemical handling areas.

In embodiments, the system can include interactive algorithms wherein the system take into account surface. Commercial application can be chosen to apply additional layers to allow for forklift traffic and chemical handling areas. Surface abrasive resistance can be factored in with a coating for heavy forklift traffic. More adhesion less slip. In pool areas wherein anti slip surfaces are necessary, the system would include additional % of anti-slip additive and can add more if necessary to allow for a high traffic area such as a hotel lobby area so that slip, and falls are minimized.

In embodiments, the system can include interactive algorithms wherein the system takes into account the address of where the desired surface protection is going to be installed and calculates logistical costs involved in traveling from the professional service provider's office and operations center and allows to accurately estimate travel time and expenses to location for site inspection as well as material, equipment, and personnel transportation to and from and to make sure a job doesn't become unprofitable. The system adds a charge for travel time, the number of people, the number of installation days, the number of travel visits necessary in a job.

In embodiments, the system can include interactive algorithms wherein the system can allow for overrides by the customer who prefers conditions which may not be optimal, but because of customer preference, these suggested options can be overridden.

In embodiments, the system can include interactive algorithms wherein the system can include area from measurements and to preload exterior areas with an image and automatically calculate area. Also take pictures of interior spaces and estimate based on the images generate grid sheets and estimates. Color blends allow for unique incorporation of copyrighted and trademarked material. In embodiments, the system can incorporate a totality of factors and components which allows a sales process that benefits both consumer and the business side. It provides for creating a repeatable process that allows for more consistent results with customers and with business decisions as well. By providing a step by step process wherein the business representative interacts with a client and the system fills in the gaps of product specific, situation specific, application specific information allows for a business entity to use a plurality of different business representatives who interact with clients and because of using standard protocols and processes allows a more predictable sales margin outcome as well as being able to deliver to the customer their requested products and services with a more predictable time table to deliver product and services any minimizing uncertainties which may influence the time table for service and product delivery.

In embodiments, the system can utilize standardized scripts, protocols, and procedures to allow any business representative to interact with a customer and provide for a more predictable outcome both from the business perspective and the customer's viewpoint.

In embodiments, the system can give a uniform product.

In embodiments, the system can include tracking capabilities to capture time spent on various evolutions such as warm up and designing the floor and going over the options. It allows the business entity to provide a customer experience that was designed and intended regardless of who the business representative is who is interacting with the customer.

In embodiments, the system can include unique iterative interactive platforms that from a design perspective and the customer viewpoint to allow a controlled process wherein the specific rules and physical characteristics of each particular job are adequately assessed and utilized to provide repeatable consistent customer experiences and allow a business entity to properly capture as many variables which affect service and product delivery, time tables, and profit margins for all jobs.

In embodiments, the system can utilize personnel who do not need a long training period, minimizes variability of service provider idiosyncrasies.

In embodiments, the system can be designed to be allow the customer to be educated and the business process from the sales perspective can include the ability to get a finalized contract and minimizes the old-fashioned running by the deal to a local service manager.

In embodiments, the system can take into account unique attributes and variabilities within sales representatives, and manager on duty (MOD), and the system can allow to any uncertainty from the MOD, to take the MOD out of the process.

In embodiments, the system can be configured so that once a business representative formulates an offer, the system can almost immediately calculate how profitable the job offer is going to be.

In embodiments, the system can calculate profitability, and allow different variables for raw materials to be appropriately change with market conditions and/or predictions of market conditions which will affect raw material pricing and include those variations into the sales formula and to the offer calculation.

In embodiments, the can take into account current market conditions such as interest rates and incorporate those into the calculations to ensure that job offers and same as cash and no interest for 12 month deals are made in accordance with interest rate projections.

In embodiments, the system can include iterative interactive pricing modules which take into account market interest rate fluctuations and are programmed into the process so that offer and counter offers with respect to same as cash and no interest for a period of time terms and conditions can be automatically included in a system response to a customer's offer.

In embodiments, the system can automatically include whether a two four or more layered system is required in an application and can include these factors in the pricing.

In embodiments, the system can include factors which take into account local physical constraints with respect to time of day access, length of access to spaces, ventilation restrictions, surrounding area conditions, the necessity to maintain a positive or negative pressurized localized work space with respect to the surrounding areas.

In embodiments, the system can include taking into account whether you are working in a hospital, clean room.

In embodiments, the system can include rules to take into account different modules for pricing, design, offer-counter offer, and taking into account the totality of components to come up with a system that can include a plurality of rules, a plurality of process flow charts, a plurality of captured estimates of time required for each evolution.

In embodiments, the system can include a plurality of mobile devices and internet-based algorithms.

In embodiments, the system can include algorithms designed to continuously redefine the rules and protocols being utilized based on previously recorded job evolutions.

These and other features and advantages will become apparent from the following detailed description of illustrative embodiments thereof, which is to be read in connection with the accompanying drawings.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The following detailed description is exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
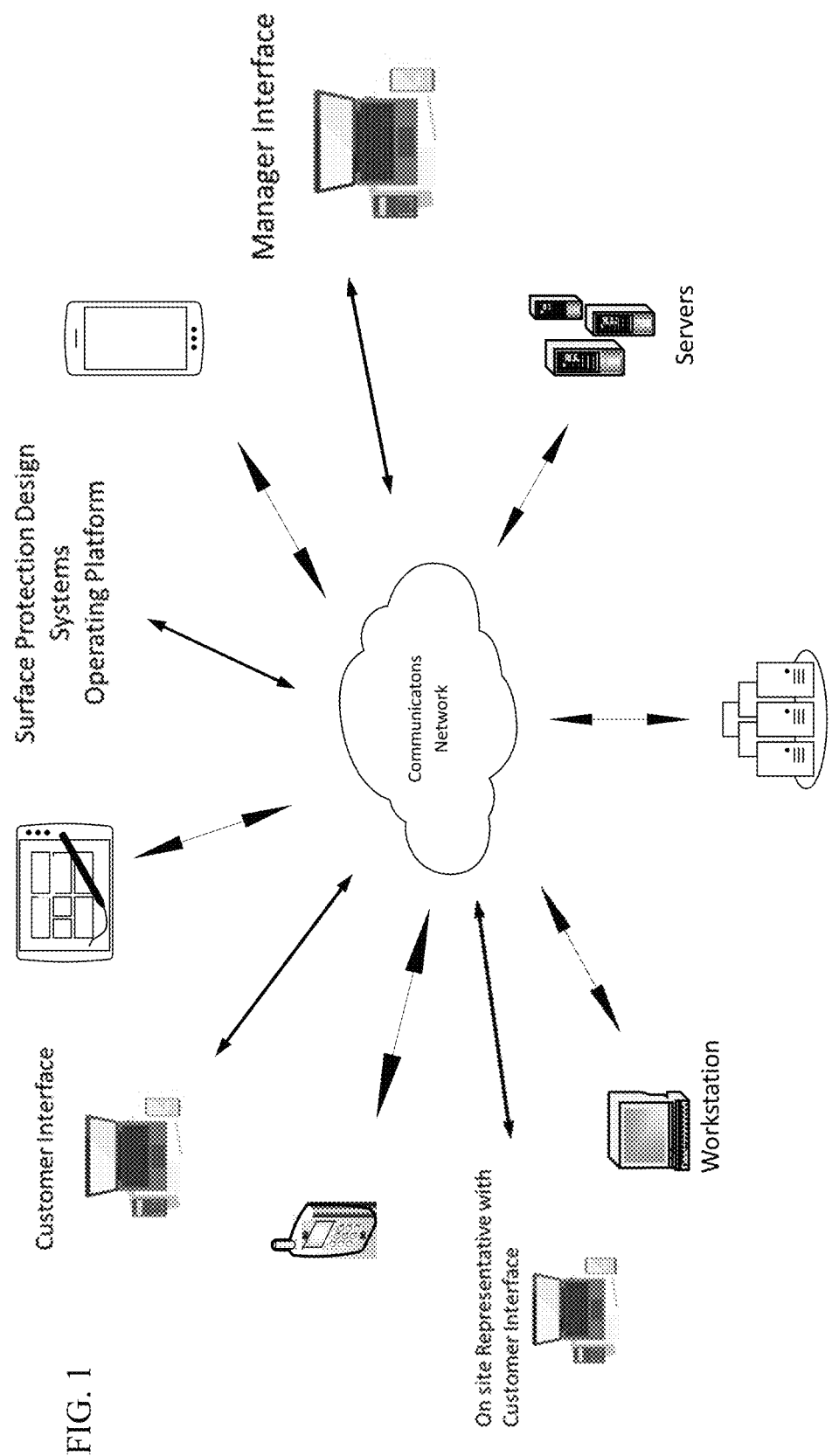
FIG. 1 is a functional schematic view of components and communications pathways in an embodiment of the present invention.

Referring initially to FIG. 1, an overview of system components and communications pathways are illustrated. In embodiments, computer software, algorithms and specialized rules are applied, mobile devices, Wi-Fi and other wireless and wired communications are used to connect devices, in order to utilize embodiments of surface protection design systems. A consumer can utilize a mobile device to interact with the system to specify spaces, unique surface requirements in building a design for surface protection for a space. The system can include unique algorithms, specialized rules, and site specific recommendations in providing guidance to the consumer of desired design options and add-ons to allow optimum surface protection. Utilizing laptops, desktops, and/or other mobile devices a business representative can interact with a consumer in negotiating a finalized agreement which can be performed in an almost real time fashion.

Figure 2:
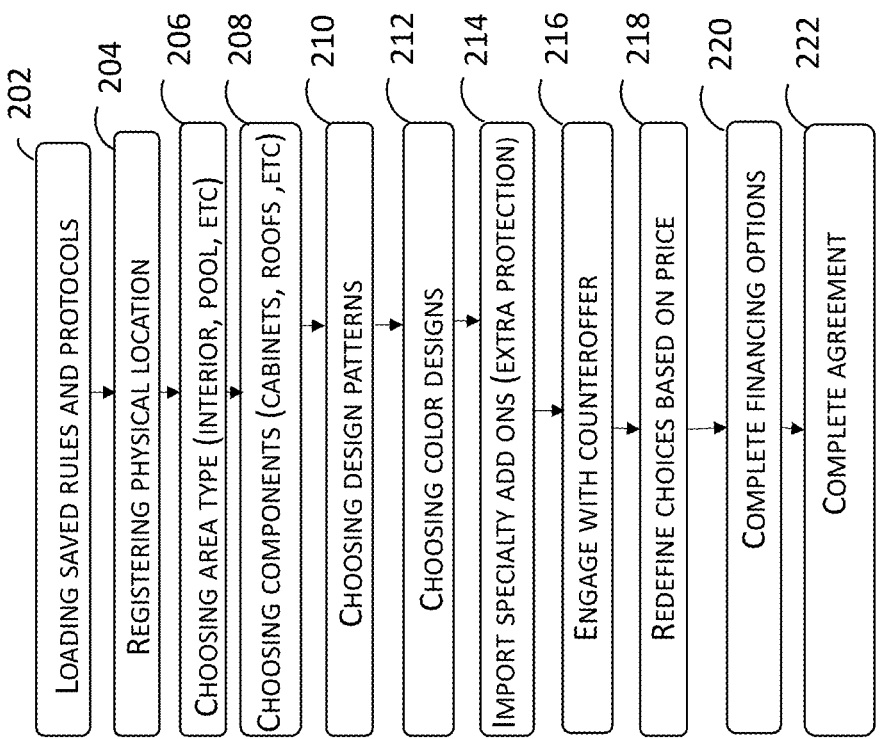
FIG. 2 is a flow chart listing steps included in a method of designing surface protection systems in an embodiment of the present invention.

FIG. 2 shows steps in a method of an embodiment of the present invention. The program can allow for loading saved rules and protocols 202 that are updated based time sensitive material availability and pricing information. Also, rule 202 can be applied which are application and location specific. The program can register physical location 204 information which may take into consideration factors such as distance from local operations office to the location, temperature and environmental conditions, transportation restrictions, sun light intensity, hours of sunlight, humidity levels, and other factors which may be taken into consideration in choosing the appropriate design features of a surface protection design. The program can include choosing the area type 206 in which the surface protection will be applied. Allowing the program to take into consideration whether the space being designed will be an interior space, exterior space, garage, patio, loading dock, atrium, hallway, bedroom, kitchen, or specialized room, will allow the program to introduce recommendations for the design features of the surface protection system. Further, the program can allow for choosing components 208 such as, but not limited to, cabinets, closets, roofs, stairways, handrails, gazebos, built in shelving, overhangs, and other physical components which may provide for application of additional rules and specialized characteristics which may be beneficial to those components. Also, the program can allow for choosing design patterns 210 to be applied. Additionally, the program can allow for choosing color designs 212 to be applied to the surface protection design.

Continuing with FIG. 2, the program can include considerations for importing specialty add-ons 214 for extra protection. The consumer can then engage with the counteroffer segment 216 of the program which can allow for a near real time iterative process to obtain an agreement as to a final design choice. The consumer can further redefine choices 218 based on price data. Afterwards, the consumer can engage with the program to complete financing options 220 and then enter into a complete agreement 222 between the consumer and the business owner.

Figure 3:
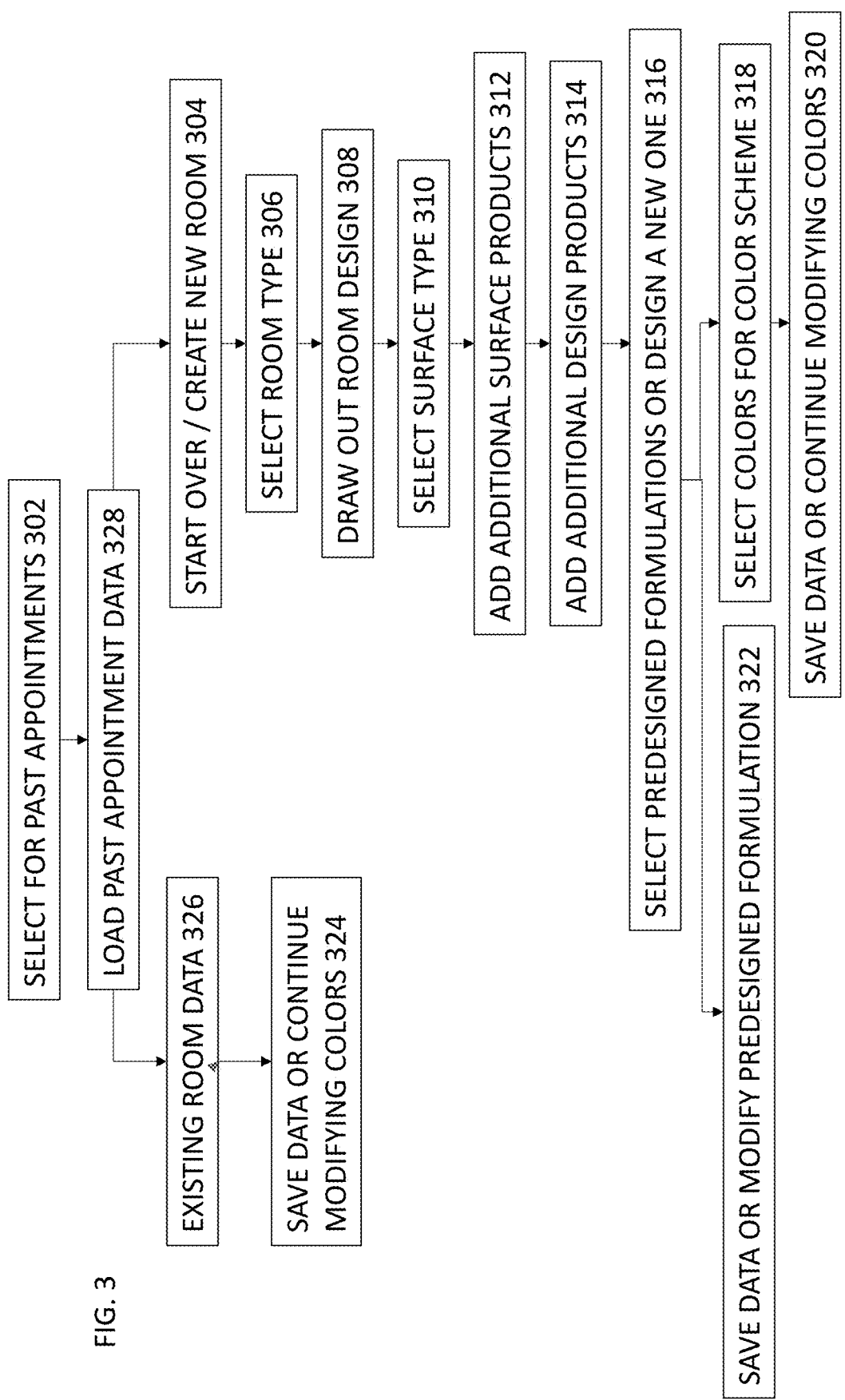
FIG. 3 is a flow chart listing steps included in a method of designing surface protection systems in an embodiment of the present invention.

Turning to FIG. 3, a method of the present invention is presented. The method can include the step of searching for past appointments 302. The program can perform the step of loading past appointment data 304. This data can be design choice data, surface add-ons, cost data, and other design choices. The program can allow for the step of starting over from scratch and also adding on a new room 304. The step of selecting a room type 306 can allow further design choice modifications by choosing if a room type such as a bedroom, hallway, storage closet, loading dock, or stairwell is included. The program allows for a step wherein drawing out a room design 308 providing the ability of a consumer to hand draw and design a new space layout. Also, the program includes the ability for selecting a surface type 310. Surface types can include non-skid, textured surfaces, tiles surfaces, polycarbonate surfaces, stone, pavers, water permeable or non-water permeable surfaces. Further, the program can include the capability of adding additional surface products 312. These additional surface products can include sublayer protection against pressure buildup, subsurface protection for structural support, non-glare components, and other structural characteristic based products. The system can include steps such as adding additional design products 314. The system can also include a step for selecting predesigned formulations of designing new ones 316. Moreover, the system can include steps wherein a consumer is selecting colors for a color scheme 318 for the surface protection design. The system is configured to allow saving data to continue modifying colors 320. Also, the system can include the step of saving data or modifying predesigned formulations 322.

Figure 4:
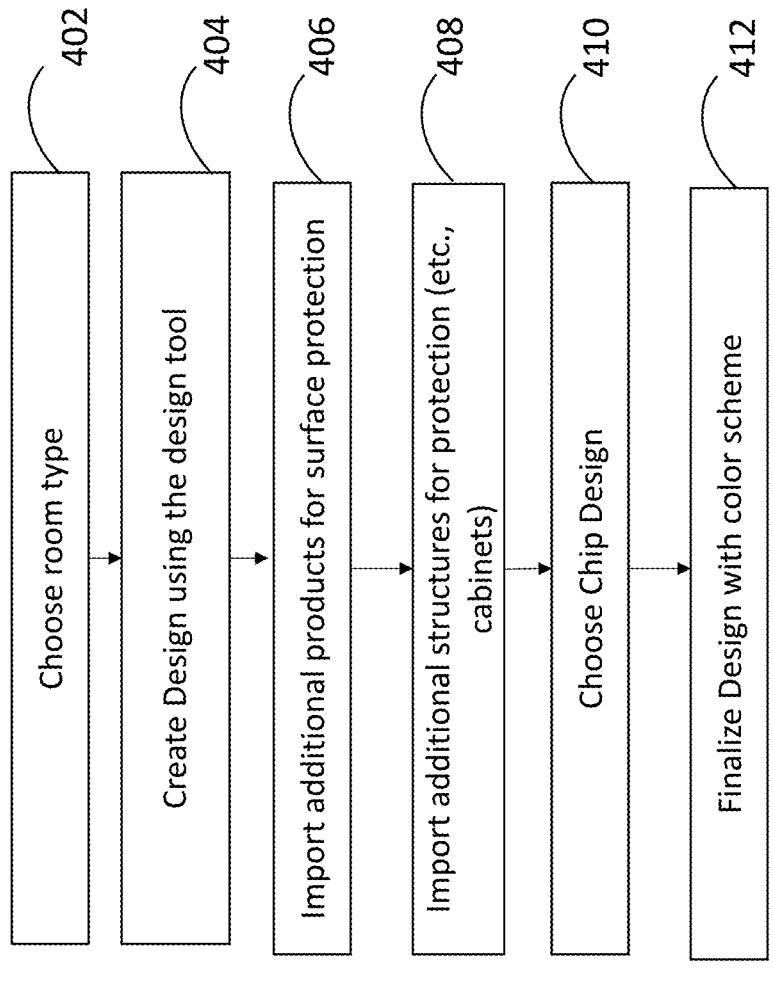
FIG. 4 is a flow chart listing steps included in a method of designing surface protection systems in an embodiment of the present invention.

As best seen in FIG. 4, the system can include methods allowing for choosing a room type 402. Further, the system can include the step of creating a design using the design tool 404. The system can allow importing additional products for surface protection 406. The program can allow for importing additional structures for protection 408. The system can include method steps for choosing a chip design 410. The system can also allow for finalizing design with color scheme 412.

Figure 5:
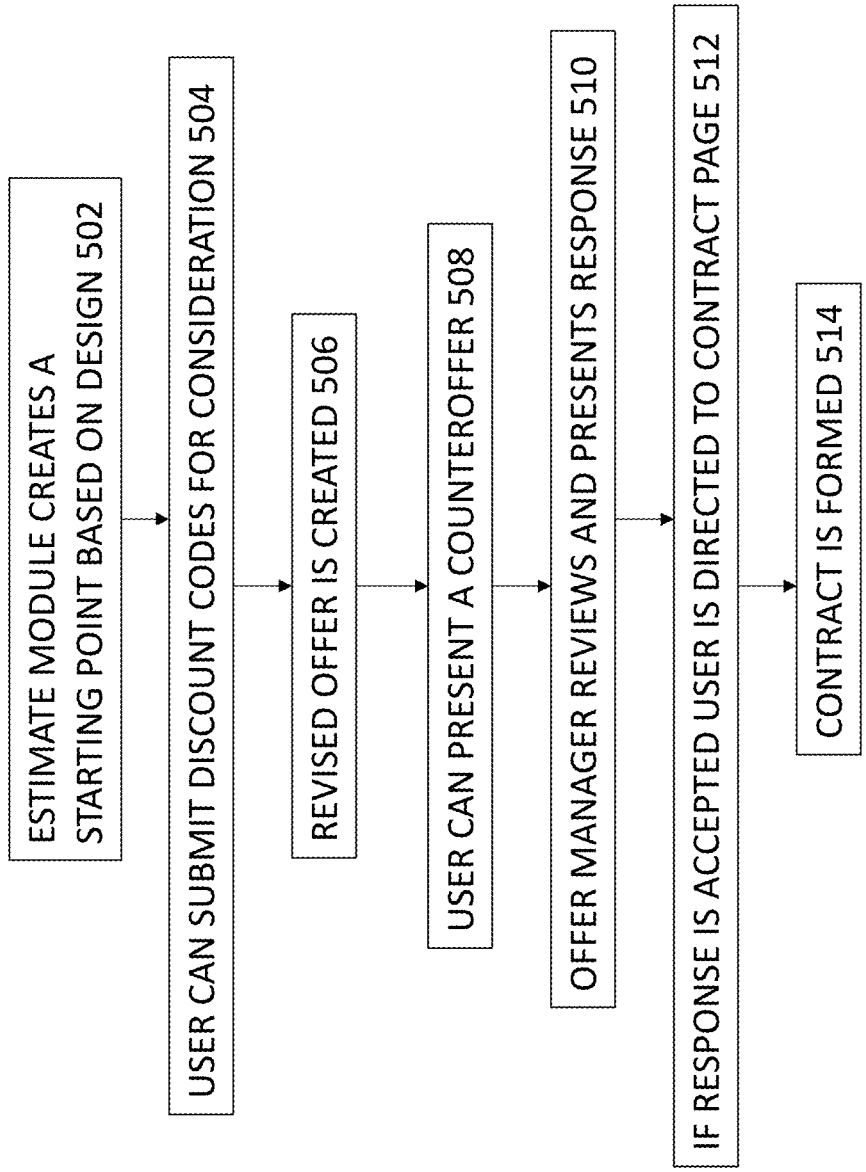
FIG. 5 is a flow chart listing steps included in a method of designing surface protection systems in an embodiment of the present invention.

A shown in FIG. 5, in embodiments of the present invention, an estimating module 502 creates a starting point based on a chosen design. The system can allow the system user to submit discount codes for consideration 504. The system can also allow for creating a revised offer 506. The system can allow for a manager to review and allow for a manager to present a response 510. The program can allow for an iterative process of offer and counteroffer until an agreement to terms is reached. The system can allow for accepting an agreement and directing user to a contracts page 512. The system can also provide for forming the contract 514 between the user and the business.

Figure 6:
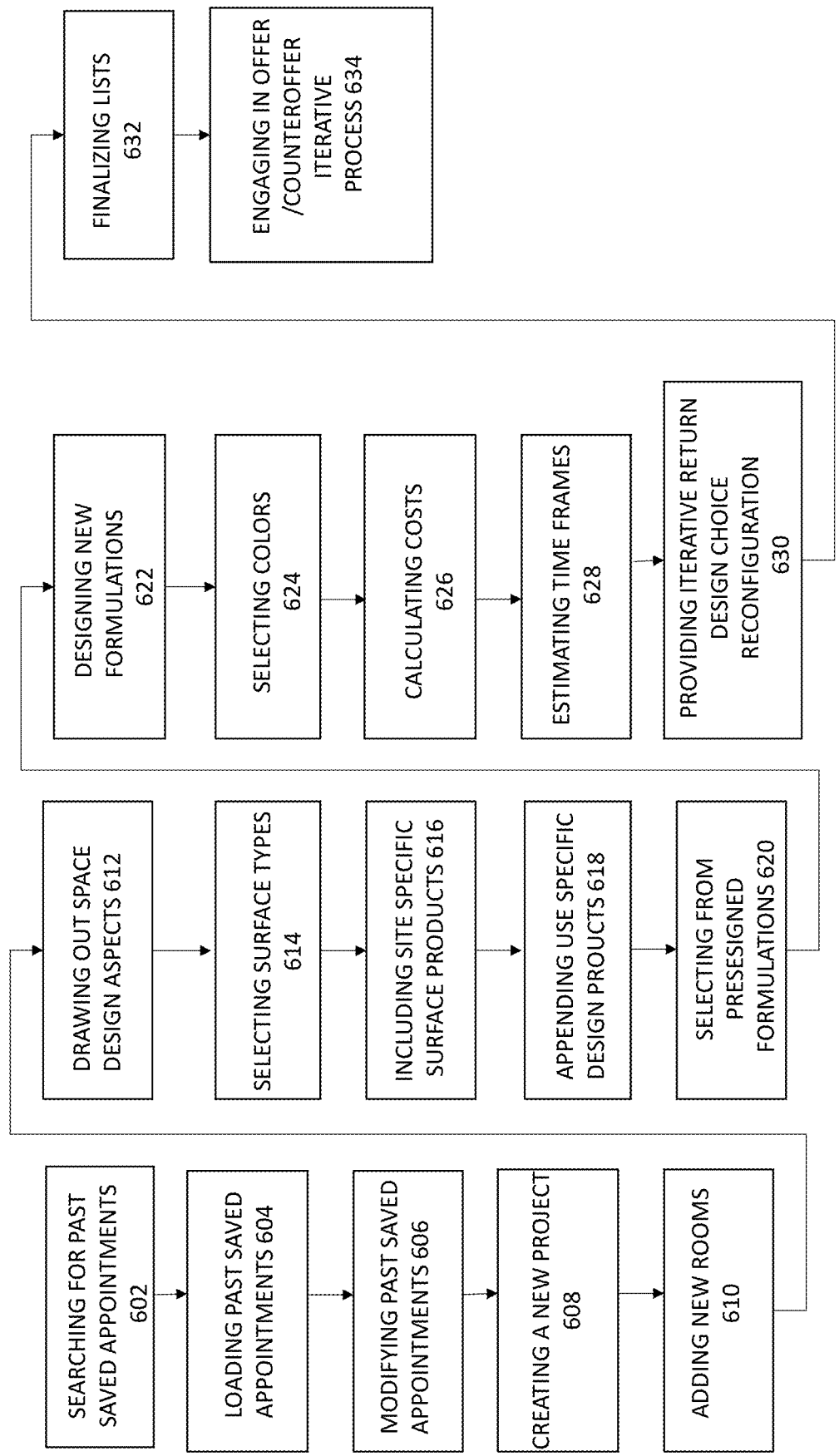
FIG. 6 is a flow chart displaying method steps taken in an embodiment of the present invention.

Referencing FIG. 6, in an embodiment of the present invention, a method for designing a surface protection system is presented. The program can include searching for past saved appointments 602. The algorithm can allow for loading past saved appointments 604. The system can include steps for modifying past saved appointments 606. In a method step, creating a new project 608 can be performed. The process can include steps for adding new rooms 610. The system can include processes for drawing out space design aspects 612. The system can include methods steps for selecting surface types 614. The system can include algorithms which allow for including site specific surface products 616. The method can include steps for appending use specific design products 618. Also, the system can include routines which allow selecting from predesigned formulations 620. In embodiments, the system can include steps for designing new formulations 622. The system can provide steps for selecting colors 624. The program can include algorithms which allow for calculating costs 626. In embodiments, the program can include steps for estimating time frames 628. In exemplary embodiments, the system can include algorithms, processes, routines, arranged for iterative cycles for providing iterative return design choice reconfiguration 630. In embodiments, the system can provide for finalizing lists 632. In embodiments, the program can allow for engaging in an offer counteroffer iterative process 634.

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A computer implemented method for designing surface protection systems for spaces, the method comprising the steps of:
   searching for past saved appointments;
   loading selected past saved appointments;
   modifying the selected past saved appointments;
   creating a new project based on the modified selected past saved appointments;
   adding new rooms and features to the new project;
   drawing out space design aspects for the new rooms and features of the new project;
   selecting surface types for the space design aspects for the new project;
   including site specific surface products for the new project, wherein the site specific surface products incorporate products comprising sublayer protection against pressure buildup, subsurface protection for structural support, non-glare components, and other structural characteristic based products;
   appending use specific design products for the new project;
   selecting from predesigned formulations for the new project;
   designing new composite surface layer formulations utilizing algorithms which factor in measured ground moisture percentages and calculated cyclical stress cycles anticipated to be generated by surface traffic for the new project;
   selecting colors for the new project;
   calculating costs for the new project;
   estimating time frames for the new project;
   providing iterative return design choice reconfigurations;
   finalizing a list of materials, list of processes, list of costs, list of chronology of events, and description and list of deliverables for the new project;
   engaging in an offer I counter offer iterative process wherein a consumer engages in the offer I counter offer iterative process with a business owner representative and in a near real time fashion results in a mutually approved contractual agreement wherein the mutually approved contractual agreement is a legally binding agreement between the consumer and the business owner for implementation of a surface protection design for a space; and
   installing composite surface layers by installation professionals, utilizing installation sheets, materials, equipment, number of personnel, and within a number of installation days as estimated by a surface protection design system.

2. The method as recited in claim 1, wherein the method is carried out with a mobile application.

3. The method as recited in claim 1, wherein specialized rules are included in algorithms utilized in application of the computer implemented method for designing surface protection systems for spaces.

4. A computer program system, comprising:
   a processor; and
   a computer usable medium having a computer readable program code therein, the computer readable program code adapted to be executed for designing a surface protection design and agreement,
   wherein the computer readable program code which when executed by the processor, allows the computer system to perform the steps of
   searching for past saved appointments;
   loading selected past saved appointments;
   modifying the selected past saved appointments;
   creating a new project based on the modified selected past saved appointments;
   adding new rooms and features to the new project;
   drawing out space design aspects for the new rooms and features of the new project;
   selecting surface types for the space design aspects for the new project;
   including site specific surface products for the new project, wherein the site specific surface products incorporate products comprising sublayer protection against pressure buildup, subsurface protection for structural support, non-glare components, and other structural characteristic based products;

appending use specific design products for the new project;

selecting from predesigned formulations for the new project;

designing new composite surface layer formulations utilizing algorithms which factor in measured ground moisture percentages and calculated cyclical stress cycles anticipated to be generated by surface traffic for the new project;

selecting colors for the new project;

calculating costs for the new project;

estimating time frames for the new project;

providing iterative return design choice reconfigurations;

finalizing a list of materials, list of processes, list of costs, list of chronology of events, and description and list of deliverables for the new project; and engaging in an offer I counter offer iterative process wherein a consumer engages in the offer I counter offer iterative process with a business owner representative and in a near real time fashion results in a mutually approved contractual agreement wherein the mutually approved contractual agreement is a legally binding agreement between the consumer and the business owner; and installing composite surface layers by installation professionals, utilizing installation sheets, materials, equipment, number of personnel, and within a number of installation days as estimated by a surface protection design system.

5. The method as recited in claim 4, wherein the method is carried out with a mobile application.

6. The method as recited in claim 4, wherein specialized rules are included in algorithms utilized in application of the computer implemented method for designing surface protection systems for spaces.

* * * * *